United States Patent
Svendsen et al.

(10) Patent No.: US 8,703,082 B2
(45) Date of Patent: Apr. 22, 2014

(54) METHOD FOR CAPTURING $CO_2$ FROM EXHAUST GAS

(75) Inventors: Hallvard F. Svendsen, Trondheim (NO); Finn Andrew Tobiesen, Trondheim (NO); Thor Mejdell, Trondheim (NO); Karl Anders Hoff, Trondheim (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 12/448,252

(22) PCT Filed: Dec. 17, 2007

(86) PCT No.: PCT/NO2007/000447
§ 371 (c)(1),
(2), (4) Date: Dec. 4, 2009

(87) PCT Pub. No.: WO2008/072979
PCT Pub. Date: Jun. 19, 2008

(65) Prior Publication Data
US 2010/0092359 A1     Apr. 15, 2010

Related U.S. Application Data

(60) Provisional application No. 60/874,963, filed on Dec. 15, 2006.

(51) Int. Cl.
*B01D 53/62* (2006.01)
*B01D 53/73* (2006.01)
*B01D 53/80* (2006.01)
*B01D 53/96* (2006.01)

(52) U.S. Cl.
USPC ........... 423/232; 423/220; 423/222; 423/223; 423/226; 423/228; 423/229

(58) Field of Classification Search
USPC ......... 423/210, 220, 222, 223, 226, 228, 229, 423/232
See application file for complete search history.

(56) References Cited

U.S. PATENT DOCUMENTS

| | | |
|---|---|---|
| 4,112,050 A | 9/1978 | Sartori et al. |
| 4,271,132 A | 6/1981 | Eickmeyer |

(Continued)

FOREIGN PATENT DOCUMENTS

| | | |
|---|---|---|
| CN | 1780677 | 5/2006 |
| WO | 2006/022885 | 3/2006 |
| WO | 2006/108532 | 10/2006 |

OTHER PUBLICATIONS

Senese, F. "Separating Mixtures." (c)1997-2005 (last updated Jul. 25, 2005). Viewed Mar. 9, 2013 at http://antoine.frostburg.edu/chem/senese/101/matter/separation.shtml.*

(Continued)

*Primary Examiner* — Stuart Hendrickson
*Assistant Examiner* — Daniel Berns
(74) *Attorney, Agent, or Firm* — Wenderoth, Lind & Ponack, L.L.P.

(57) ABSTRACT

The present invention relates to a method for capturing $CO_2$ from exhaust gas in an absorber (A1), wherein the $CO_2$ containing gas is passed through an aqueous absorbent slurry wherein said aqueous absorbent slurry comprises an inorganic alkali carbonate, bicarbonate and at least one of an absorption promoter and a catalyst, and wherein the $CO_2$ is converted to solids by precipitation in the absorber, said slurry having the precipitated solids is conveyed to a separating device (F1), in which the solids are separated off, essentially all of at least one of the absorption promoter and catalyst is recycled together with the remaining aqueous phase to the absorber.

7 Claims, 1 Drawing Sheet

(56) References Cited

U.S. PATENT DOCUMENTS

| | | | |
|---|---|---|---|
| 4,282,193 A * | 8/1981 | Melchior et al. | 423/223 |
| 5,325,606 A * | 7/1994 | Liborius | 34/589 |
| 5,683,587 A | 11/1997 | Ferrara et al. | |
| 2006/0117954 A1 | 6/2006 | Versteeg et al. | |
| 2006/0185985 A1 * | 8/2006 | Jones | 205/508 |

OTHER PUBLICATIONS

International Search Report dated Mar. 28, 2008 in the International (PCT) Application PCT/NO2007/000447 of which the present application is the U.S. National Stage.

Supplementary European Search Report issued Oct. 7, 2011 in corresponding European Application No. 07860915.3.

* cited by examiner

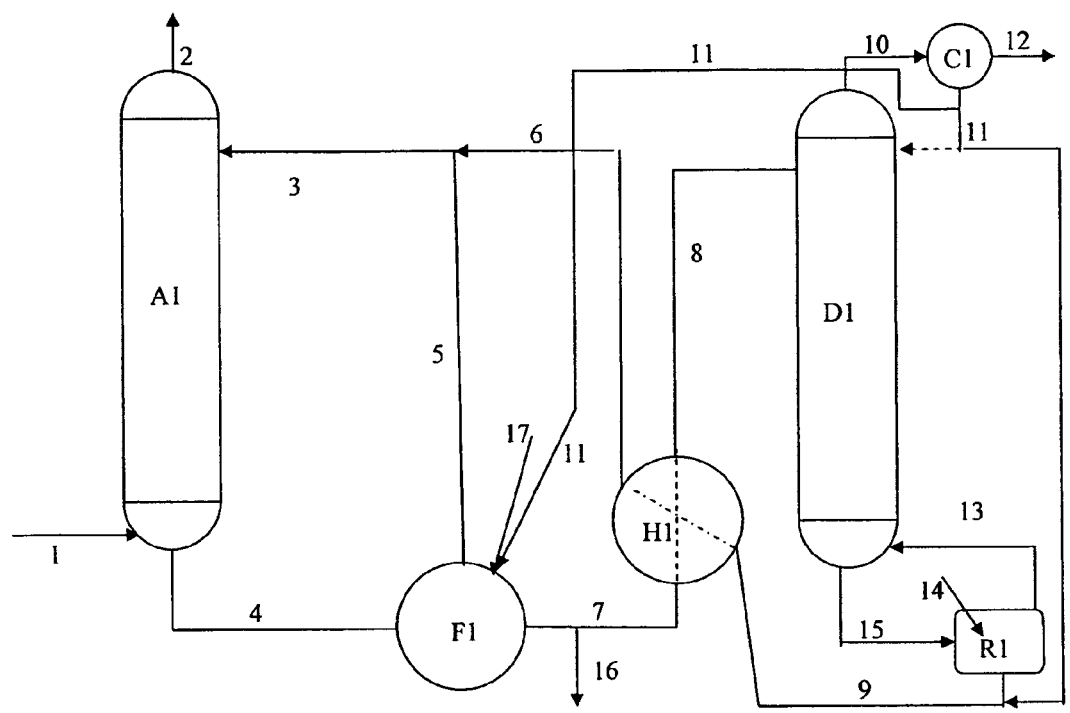

ns a National Stage Application of International (PCT) Application No. PCT/NO2007/000447, filed Dec. 17, 2007, and claims the benefit of U.S. Provisional Application No. 60/874,963, filed Dec. 15, 2006.

METHOD FOR CAPTURING $CO_2$ FROM EXHAUST GAS

This application is a National Stage Application of International (PCT) Application No. PCT/NO2007/000447, filed Dec. 17, 2007, and claims the benefit of U.S. Provisional Application No. 60/874,963, filed Dec. 15, 2006.

The present invention concerns a process for capturing $CO_2$ from exhaust gases from fossil fuel fired power stations, from natural gas streams, from blast furnace oven off-gases in iron/steel plants and from reformer gases containing $CO_2$ in mixtures with $H_2$ and CO. The invention combines the advantage of precipitating out a solid that contains the bound $CO_2$, either as bicarbonate, as an amino-acid-salt/$CO_2$ complex, or as a complex with limited solubility, formed between an amine and $CO_2$, and the use of an activator or promoter to speed up the absorption reaction to an acceptable level.

AREA OF INVENTION

It is well known in the field of gas treating to remove acid gases from a gas or vapour stream by contact with amine or carbonate solutions to remove these acid gases. The conventional layout of such an absorption plant includes, in its most simplified form, the use of an absorber and a desorber where the solution is circulated in a continuous cycle. A main issue with these processes, especially in cases of removal of $CO_2$ from low partial pressure flue gases, is the energy required for regenerating the absorbent.

Most of this energy is supplied to the desorber reboiler where the lean absorbent solution is produced. Amine-based processes typically require 3200-4100 MJ/ton $CO_2$ captured from low partial pressure processes. For example, conventional technology, like the Fluor Econamine process will typically use about 3850 MJ/ton $CO_2$ captured. Improvement of this process, the Fluor Econamine FC Plus process is claimed to require about 3250 MJ/ton $CO_2$ captured (S. Reddy et al. Proceedings $2^{nd}$ national conference on Carbon sequestration, pp 1-11, Alexandria USA, Ma 2003). Mitsubishi has developed processes and their absorbent KS-1 is claimed to require about 3250 MJ/ton $CO_2$ captured (Mimura et al. Energy Convers. Mgmt. 36 (1995), pp 397-400 and Chem. Eng. Comm., 170 (1998), pp 245).

For $CO_2$ capture from high and medium pressure gases like reformer gas ($CO_2$ and $H_2$) and natural gas tertiary amines, both promoted and un-promoted, are in use, as well as processes based on potassium carbonate ($K_2CO_3$). These processes utilize the higher $CO_2$ partial pressure and can lower the heat requirement by a combination of temperature and pressure swing in the process. Examples of $CO_2$ capture from high and medium pressure gasses are the Hot Potassium processes or Benfield processes (Kohl A. and Nielsen R., Gas Purification, Gulf PC, Houston 1997). The classical Benfield process (ibid.) uses a potassium carbonate solution and typically requires about 2500 MJ/ton $CO_2$ captured. The Benfield Lo-Heat process utilizes low level heat and can get down to about 1000 MJ/ton $CO_2$ captured in added heat. All existing potassium carbonate processes operate in solution. Promoters are in use to speed up the reactions, among them amines.

However, further reductions in energy requirement; in particular for $CO_2$ removal from post combustion exhaust gases is needed in order to make absorption a viable technology for $CO_2$ removal from exhaust gases.

A number of patents disclose usage of different types of amines as activators in an alkaline absorbent solution wherein the primary absorbent is an alkaline salt such as potassium carbonate. The inclusion of a designated activator such as an amine can yield higher capacity compared to systems where the amine or alkali metal carbonate compound appear alone. See for example, U.S. Pat. Nos. 2,718,454; 3,144,301; 3,637,345; 3,793,434; 3,848,057; 3,851,041; 3,856,921; 3,896,212; 4,271,132 and 4,430,312; BE 767,105; CA 980538 and ZA 9710745.

U.S. Pat. No. 3,896,212 describes the use of a major proportion of alkali metal salts, potassium carbonate and potassium borate, and a minor proportion of a catalytic activator for $CO_2$ removal from a gaseous stream. Belgian Pat. No. 767,105 discloses a process for removing acid gases from gaseous streams by contacting the gaseous streams with a solution comprising potassium carbonate and an amino acid.

These above-described prior processes involve the improvement of the traditional absorption/desorption cycle with liquid absorbents throughout the process. Slurry formation and solid precipitation is traditionally considered a problem and something that should be avoided in absorption processes.

Alstom has recently launched the so-called Chilled Ammonia process. This process is based on $CO_2$ capture into ammonium carbonate slurry. The absorber is run at a low temperature, 0-15° C. in order to condense water and to avoid slip of ammonia in the cleaned exhaust gas. Ammonium bicarbonate is formed in the absorber and, having a lower solubility than the carbonate, precipitates. The solid ammonium carbonate and bicarbonate mixture is then partially dewatered and passed to the desorber stage taking place at high pressure. The desorption temperature is elevated, but may possibly be lower than commonly used in amine processes. The Alstom Chilled Ammonia process is restricted to ammonium carbonate/bicarbonate and does not utilize a promoter during absorption. As noted, the process must also be operated at low absorber temperatures leading to difficulties during operation, low capture efficiency due to very slow kinetics at low temperature, as well as energy intensive absorbent cooling.

The process described in the present invention operates at significantly different temperature than the Alstom process. In addition, the present invention utilizes an activator or catalyst to increase the rate of absorption even further.

Absorption into and precipitation of carbonates is a rather slow process, and thus, deemed less commercially interesting. By using promoters and/or catalysts which are recycled, the absorption rate can be increased significantly.

In a patent that involves the use of slurries, a precipitating amino acid salt solution for $CO_2$ capture is utilized, (WO 03/095071 A1), In this concept the absorbed $CO_2$ is captured in a precipitate that is formed when certain amino acid salts are loaded with $CO_2$. The $CO_2$ so captured will not contribute in the equilibrium $CO_2$ pressure in the gas phase, thus maintaining a high driving force for absorption, while increasing the capacity of the circulating solvent.

The present invention involves a process which is significantly different from the conventional processes and concepts described above, through the utilization of regenerative slurries in conjunction with absorption promoters or catalysts. In particular, for this invention, the solid that is formed in the absorber or crystallizer, is separated from the solution containing the activator or catalyst where principally only the solid/slurry is conveyed to the regenerator(desorber). The promoter or catalyst is thereby separated and does not pass to the regenerator but rather mixed with the lean slurry coming from the regenerator, before it again enters the absorber.

SHORT DESCRIPTION OF THE INVENTION

The present invention provides a method capturing $CO_2$ from exhaust gas in an absorber (A1), wherein the $CO_2$ containing gas is passed through an aqueous absorbent slurry wherein said aqueous absorbent slurry comprises an inorganic alkali carbonate, bicarbonate and at least one of an absorption promoter and a catalyst, and wherein the $CO_2$ is converted to solids by precipitation in the absorber, said slurry having the precipitated solids is conveyed to a separating device (F1), in which the solids are separated off, essentially all the absorption promoter and/or catalyst is recycled together with the remaining aqueous phase to the absorber.

The precipitated solids contain bound $CO_2$ as bicarbonate, as an amino-acid-salt/$CO_2$ complex, or a complex with limited solubility, formed by an amine and $CO_2$.

The solids which are separated off form a filter cake. This is sucked dry by utilizing an under-pressure. After dewatering, the filter cake is washed, and the used wash water can be recycled to the absorber.

The filter cake containing a minimum of promoter and/or catalyst is dewatered, heated in a heat exchanger and conveyed to a desorber for the release of $CO_2$.

FIGURES

FIG. 1 shows a simplified sketch of the slurry $CO_2$ capture process.

DETAILED DESCRIPTION OF THE INVENTION

In its simplest principal form, the process is shown in FIG. 1. The $CO_2$-containing gas stream, 1, enters the absorber, A1, bottom and flows upwards. It meets a liquid absorbent stream, 3, which is a stream containing a slurry of water, a mixture of the carbonate/bicarbonate of Li, Na, or K, and a promoter or catalyst. This implies that the aqueous phase is partially or fully saturated with the carbonates and bicarbonates such that the flow contains both solid and liquid. In addition to the carbonate/bicarbonates, the aqueous solution contains an absorption promoter and/or catalyst. Examples of promoters or catalysts are: piperazine, N-2-hydroxyethylpiperazine, N-(hydroxypropyl)piperazine Diethanol triamine (DETA), 2-((2-aminoethyl)amino)ethanol (AEEA), monoethanolamone (MEA), diethanolamine (DEA), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 2-amino-2-methylpropanol (AMP), 1-amino-2-propanol (MIPA), 2-methyl-methanolamine (MMEA), piperidine (PE) or mixtures thereof. Alternatively, the rate promotion effect may be achieved by addition of a species known to catalyse the $CO_2$ hydration reaction. Examples of these are: arsenite, hypochlorite, sulphite or the enzyme carbonic anhydrase. The promoter or catalyst can also be selected from the group comprising glycine, sarcosine, alanine N-secondary butyl glycine and pipecolinic acid.

The operating temperature of the absorber will depend on the inlet flue gas temperature and will typically be from 30° C. to 100° C., preferably from 40° C. to 90° C. The flue gas should preferably contain only small amounts of $SO_2$, typically <100 ppm which still is a higher limit than normally required in amine processes. Further cooling or pre-treatment of the flue gas will normally not be needed, but in some cases with high temperature and water content, some cooling and water removal might be necessary. Small amounts of fly ash and gypsum (if a gypsum FGD process is used) carried with the inlet gas will be caught by the absorbent slurry and removed as described later. In the absorber, the $CO_2$ is absorbed into the aqueous slurry and the exhaust with reduced $CO_2$ content leaves the absorber, where only a small optional water wash section, is placed as shown in stream 2. This water wash is only needed to retain the promoter, depending on its volatility. The combination of a reasonable temperature and the use of a promoter or catalyst will ensure an effective and rapid absorption, thus alleviating the need for excessive tower height. The heat of absorption of the $CO_2$ in carbonate is considerably lower than what is found in conventional amine units and thus the temperature increase in the absorber will be low facilitating better absorption conditions. The tower can be a spray tower, but a packed tower or a plate tower able to handling slurries, can also be used. In the aqueous phase the following chemical reaction will take place, here exemplified with sodium, but equally well with potassium and lithium:
Reaction:

$$Na_2CO_3(aq)+H_2O+CO(g)=2NaHCO_3(aq+s)$$

The entering slurry will typically be high in $Na_2CO_3$ and low in $NaHCO_3$. This implies that the overall $Na/CO_2$ ratio in the aqueous slurry should be as close to 2 as possible. At a value of 2, the slurry/solution will contain only carbonate. As $CO_2$ is absorbed the $Na/CO_2$ ratio decreases and at the bottom of the tower it should be as close to 1 as possible. A value of 1 corresponds to full conversion to bicarbonate. As the bicarbonates of potassium and sodium are less soluble than the carbonates, this will lead to a formation of more solid precipitate in the absorber. The precipitating $CO_2$ bound in the form of an alkali bicarbonate will facilitate a higher loading capacity as it will not contribute to the backpressure of $CO_2$ over the slurry. The slurry leaves the absorber at the bottom, stream 4. The promoter and/or catalyst are/is all the time fully dissolved in the aqueous phase and should not adsorb on the solids forming. The slurry leaves the absorber at a temperature of 40-90° C. depending on the inlet gas condition, but typically lower than for a conventional amine process. One of the objects of the present invention is to treat the slurry as it evolves in the absorber and to make use of the enhanced absorption capacity, as $CO_2$ bound in the precipitate will not contribute to the equilibrium backpressure over the solution. Optionally, the absorber can be a traditional type where no solids are formed, and thus, no slurry treatment is necessary, such as a simple packed or structured column. The absorption occurs until the solvent is saturated, or supersaturated and the loaded liquid solution is then transferred optionally to a crystallization unit where the solids are formed. A part of the flue gas containing $CO_2$ is conveyed via this unit to enhance absorption as well as increase solidification. In addition, the unit can be cooled to further enhance crystallization. As a third alternative it can be a combination of the two where a crystallizer is integrated in the absorber sump.

The slurry is then passed to a device for solid separation, in FIG. 1 exemplified as a rotating filter, F1. On the rotating filter the precipitate forms a filter cake. This filter cake is, after its formation, sucked dry by utilizing an under-pressure in a dewatering section of the filter. After dewatering, the filter cake is washed on the filter, using the water balance of the process as wash water, stream 17, after which the cake is dewatered again. The wash water can be recycled, not shown in FIG. 1, and a bleed from the wash water recycle stream is added to the returning slurry stream 5. The dewatered solids leave the dewatering operation, F1, as stream 7. The purpose of the dewatering and washing section is to remove all or most of the promoter and/or catalyst from the filter cake so the solid, mainly alkali bicarbonate, can be treated at an elevated temperature without loss or degradation of promoter/catalyst. Thus the promoter will only be exposed to the relatively low temperatures of the absorber and a much lower degradation rate than in conventional amine processes is achieved. This opens up for a much wider range of promoters and catalysts than can usually be used in amine processes. The amounts should be so small that they do not adversely affect operation of the process.

In addition the mass flow rate passing to the desorber will become much smaller, and the sensible heat loss, because of the need to heat the stream to the desorber, becomes smaller than in conventional amine processes.

As mentioned, the rotating filter is just used as an example and other separation units are envisaged, such as cyclones, hydrocyclones, all kinds of rotating and stationary filters, and also sedimentation.

The filter cake should preferably be as dry as possible (low water content), and should contain as little as possible of the promoter.

From the dewatering and washing unit, here F1, the solid/filter cake/thickened slurry, stream 7, is sent to a heat exchanger H1 where it is heated and exits as stream 8. Heat is transferred from the $CO_2$-lean slurry, stream 9, returning from the desorber section D1. After heat exchange, the solid/filter cake/thickened slurry, stream 8, is sent to the desorber D1. Here it is heated further to the desired desorber temperature, typically in the range 100-270° C. The desorber can be a packed tower, a plate tower, a spray tower, a heated conveyor belt, or just a flash tank. The desorber can also be integrated into the heat exchanger. In the desorber the alkali bicarbonate releases $CO_2$, stream 10, and converts partially or totally back to carbonate. This process is much less energy intensive than the conventional amine desorption reactions, and thus a significant saving in energy can be achieved. According to reaction 1, water will be released as $CO_2$ is stripped off, thus stream 9 will be a thinner slurry than the entering stream 8. Stream 9 can also be a liquid solution depending on the concentration of alkali bicarbonate and carbonate remaining in the exit stream. Stream 9 is sent to the heat exchanger H1 and exits as stream 6, which is sent to the absorber A1. The temperature in the desorber depends on the cation chosen (Na, K, or Li) and the phase equilibrium in the system. The desorber pressure can be elevated, typically from 3-100 bar. The point here is to bring the $H_2O/CO_2$ ratio in the vapour mixture leaving the desorber, stream 10, down to the lowest possible value, thereby reducing the stripper steam energy requirement and maximising $CO_2$ desorption. Secondly, increasing the desorber pressure will make the size considerably smaller. The pressure may also be kept low, and even a pressure below atmospheric could be advantageous.

The water leaving with $CO_2$ in stream 10 is condensed in the overhead condenser, C1. The condensed water, stream 11, can be recycled in three ways. It can be returned to the stripper, D1, shown by the dashed line in FIG. 1, but this is probably the least attractive alternative. It can be mixed with the desorber bottom lean solution, 9, as shown in FIG. 1, before going to the heat exchanger H1. Probably the best alternative is to return the condensed water, stream 11, to the separation stage F1, with stream 17, as wash water. The produced $CO_2$ leaves the overhead condenser as stream 12 and may have to undergo further cooling, purification and recompression.

In FIG. 1 a reboiler, R1, is shown with incoming slurry, stream 15, outgoing vapour, stream 13, and heat input, stream 14. As mentioned the reboiler may be avoided, and the whole desorber section may become as simple as a flash stage. A bleed of the dewatered solid/filter cake/thickened slurry, stream 16, can be treated separately with aim of separating out precipitated alkali sulphates and sulphites, thus creating an outlet for the $SO_2$ in the inlet gas, that reacts with the absorbents.

Advantages with the present invention are as follow:

Normally no cooling or pre-treatment of inlet gas, apart from normal FGD is needed.

The operating temperature range in the absorber can extend from about 30° C. up to about 100° C.

An organic promoter, or a catalyst of inorganic type, can be used in the absorber to speed up the absorption process without having to consider promoter stability at desorber temperatures.

The promoter and/or catalyst are removed almost quantitatively in the slurry upgrading process such that the desorption process can be run without having to take into account degradation of organic compounds.

High desorption heat requirements associated with promoter desorption are avoided The promoter and/or catalyst being separated from the solid in the filtering stage and subsequently mixed with lean solution/slurry after the lean solution/slurry has undergone regeneration, will shift its $CO_2$-loading to the unreacted alkali carbonate at the point of mixture (a mixing tank can alternatively be placed at the mixing point depending on the rate of reaction). Since desorption of $CO_2$ from the activator has a larger reaction enthalpy than the absorption of $CO_2$ in the alkali carbonate solution, a net endothermic process will occur which will reduce solution temperature and enhance absorber performance.

The solids are dewatered such that the water phase in the slurry does not circulate via the desorber, but only with small temperature variations around the absorber. The slurry upgrading system consists of effective dewatering and washing, thus removing almost all promoter and/or catalyst and a very large percentage of the water.

The desorber can be operated at a temperature and pressure independent of promoter and/or catalyst properties.

A high pressure and a low $H_2O/CO_2$ ratio in the desorber can be achieved because of the bicarbonate instability.

The $CO_2$ can be delivered from the process at a very high pressure, reducing significantly the energy needed for $CO_2$ recompression.

The desorber and connected equipment can be smaller because of the higher operating pressure, and this can facilitate absorption from large flue gas streams. Desorber operation at sub-atmospheric pressure is possible and can in some cases be advantageous. This necessitates a gas pump on the outlet $CO_2$ stream, 12.

We claim:

1. A method for capturing $CO_2$ from exhaust gas in an absorber, wherein the $CO_2$ containing gas is passed through an aqueous absorbent slurry, wherein the aqueous absorbent slurry comprises an inorganic alkali carbonate, bicarbonate and at least one of an absorption promoter and a catalyst, and wherein the $CO_2$ is converted to solids by precipitation in the absorber, and where the slurry having the precipitated solids is conveyed to a separating device, in which the solids are separated off in the form of a filter cake, which is washed, and, by which, essentially all of the at least one of the absorption promoter and the catalyst is recycled together with a remaining aqueous phase to the absorber, and the filter cake, containing a minimum of the promoter, is dewatered, heated and conveyed to a desorber for the release of $CO_2$, and is subsequently returned to the absorber.

2. The method according to claim 1,
wherein the precipitated solids contain bound $CO_2$ as bicarbonate, as an aminoacid-salt/$CO_2$-complex or as a complex with limited solubility formed by an amine and $CO_2$.

3. The method according to claim 1, wherein the inorganic alkali carbonate is at least one of the following: $Li_2CO_3$, $Na_2CO_3$ and $K_2CO_3$.

4. The method according to claim 1, wherein the at least one of the absorption promoter and the catalyst is: piperazine, N-2-hydroxyethylpiperazine, N-(hydroxypropyl)piperazine Diethanol triamine (DETA), 2-((2-aminoethyl)amino)ethanol (AEEA), monoethanolamine (MEA), diethanolamine (DEA), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 2-amino-2-methylpropanol (AMP), 1-amino-2-propanol (MIPA), 2-methyl-methanolamine (MMEA), piperidine (PE), arsenite, hypochlorite, sulphite, enzyme carbonic anhydrase; and amino acids selected from the group consisting of glycine, sarcosine, alanine N-secondary butyl glycine and pipecolinic acid.

5. The method according to claim 1, wherein a temperature in the absorber is in a range of from 30 to 100° C.

6. The method according to claim 1, wherein solid separation is performed in at least one of the following: a rotating filter, a stationary filter, a cyclone, a hydrocyclone and a sedimentation unit.

7. The method according to claim 1 wherein the absorber is a packed tower, a plate tower or a spray tower.

* * * * *